US012757016B2

(12) United States Patent
Wei et al.

(10) Patent No.: US 12,757,016 B2
(45) Date of Patent: Oct. 6, 2026

(54) DETECTION OF UNTRUSTED CONFIGURATOR

(71) Applicant: Hewlett Packard Enterprise Development LP, Spring, TX (US)

(72) Inventors: Qin Wei, Beijing (CN); Guangning Qin, Beijing (CN); Zhiyuan Yao, Beijing (CN); Lan Pang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 683 days.

(21) Appl. No.: 18/172,669

(22) Filed: Feb. 22, 2023

(65) Prior Publication Data

US 2024/0284170 A1 Aug. 22, 2024

(51) Int. Cl.

| | |
|---|---|
| ***H04W 12/06*** | (2021.01) |
| ***H04B 17/318*** | (2015.01) |
| ***H04W 4/029*** | (2018.01) |
| ***H04W 12/04*** | (2021.01) |
| ***H04W 24/02*** | (2009.01) |

(52) U.S. Cl.

CPC .......... *H04W 12/06* (2013.01); *H04B 17/318* (2015.01); *H04W 4/029* (2018.02); *H04W 12/04* (2013.01); *H04W 24/02* (2013.01)

(58) Field of Classification Search

None

See application file for complete search history.

(56) References Cited

U.S. PATENT DOCUMENTS

| | | | | |
|---|---|---|---|---|
| 10,621,352 | B2 | 4/2020 | Nix | |
| 2015/0229475 | A1* | 8/2015 | Benoit | H04W 12/069 713/168 |
| 2018/0109418 | A1* | 4/2018 | Cammarota | H04W 12/50 |
| 2019/0306710 | A1* | 10/2019 | Cammarota | H04W 12/06 |
| 2020/0221296 | A1 | 7/2020 | Jiang et al. | |
| 2020/0336913 | A1 | 10/2020 | Pampati et al. | |
| 2021/0385778 | A1 | 12/2021 | Ahn et al. | |
| 2021/0400502 | A1* | 12/2021 | Zhang | H04W 76/14 |
| 2022/0400118 | A1* | 12/2022 | Jiang | G06F 21/45 |

OTHER PUBLICATIONS

Lee et al., "An Easy Network Onboarding Scheme for Internet of Things Networks", IEEE, vol. 7, 2019, pp. 8763-8772.

* cited by examiner

*Primary Examiner* — Adolf Dsouza

(74) *Attorney, Agent, or Firm* — Hewlett Packard Enterprise Patent Department

(57) ABSTRACT

An access point (AP) receives enrollee authentication information simulated by the network device from a network device. Then, the AP simulates an enrollee and broadcasts a configuration request including the enrollee authentication information. When a configurator responds to the configuration request, the AP identifies the configurator as an untrusted configurator, and then the AP transmits device information of the untrusted configurator to the network device. In this way, the untrusted configurator in the serving range can be detected, thereby avoiding the devices being provisioned to connect to untrusted networks.

20 Claims, 10 Drawing Sheets

DETECTION OF UNTRUSTED CONFIGURATOR

BACKGROUND

Device Provisioning Protocol (DPP) is a standard that allows devices to be easily provisioned onto a network using simple, modern techniques such as quick response (QR) code scanning. The DPP-enabled device can be brought into a network via many ways, such as by scanning a QR code, using near field communication (NFC) proximity to secure public key exchange and directly exchanging bootstrapping information with a cloud service. This reduces complexity and enhances user experience while configuring devices without user interface. For example, it is simple and intuitive for the user to use and there are no lengthy instructions to follow for the setup of a new device.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1A:
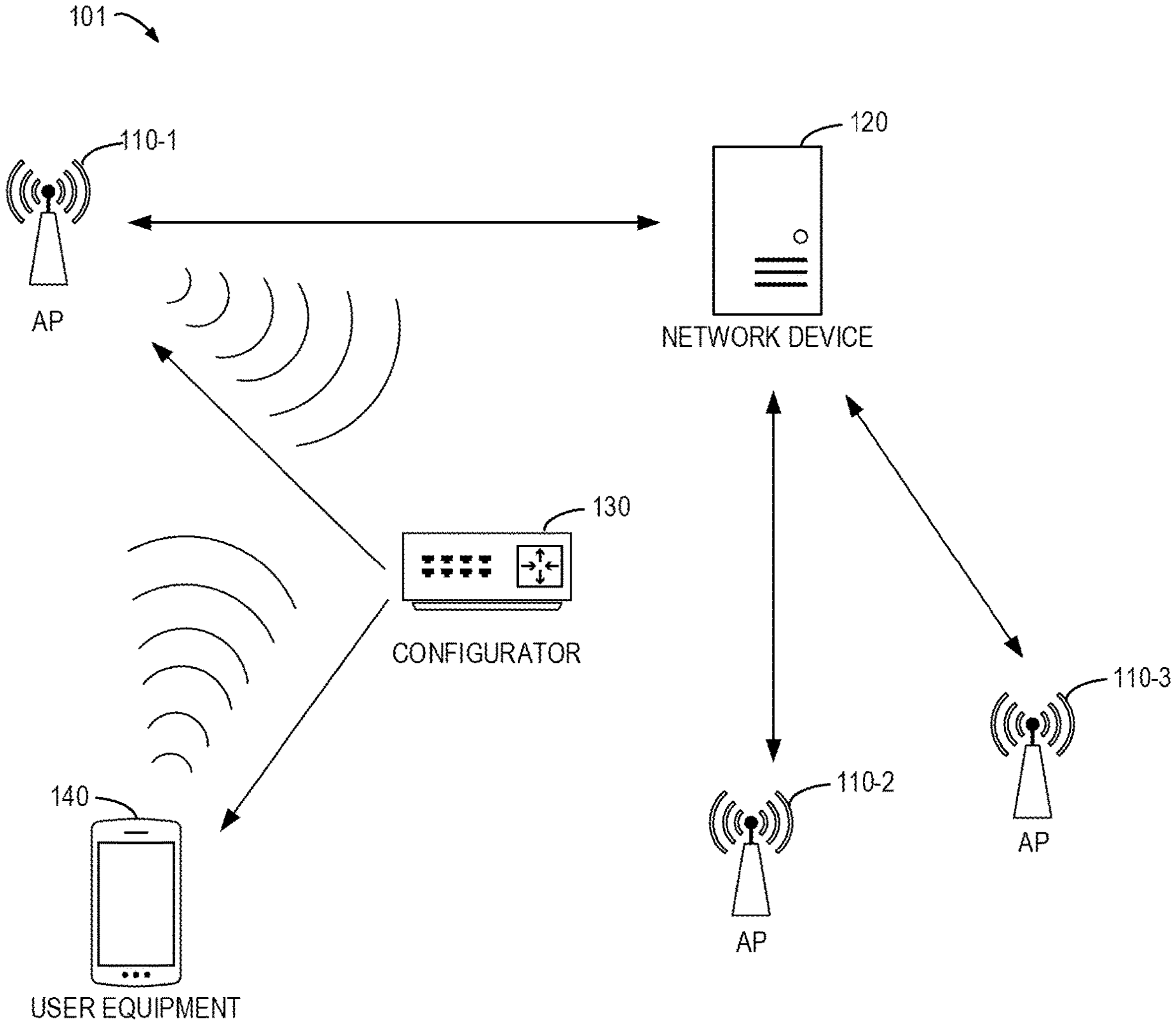
FIG. 1A illustrates an example network environment in which example implementations of the present disclosure may be implemented.

The Device Provisioning Protocol (DPP) architecture defines the device roles during bootstrapping, authentication, provisioning (configuration) and connectivity. There are two types of roles, including a configurator and an enrollee. A configurator is used to provision the enrollees.

An enrollee may be any device that can be connected to a Wi-Fi network, such as smart phones, tablets, automobiles, smart household devices and access point. A configurator may be a smart phone or a tablet. After the authentication completes, the configurator provisions the enrollee to establish secure associations with other devices in the network.

DPP devices have various ways to bootstrap with the trust in the responder's public bootstrapping key. However, unprovisioned devices that are not capable of acting as initiators and have no means of engaging in an interactive bootstrapping procedure (such as headless devices) periodically announce their presence, as unprovisioned devices, for example, by sending DPP presence announcement frames to trigger a configurator to initialize DPP Authentication and Configuration. In this procedure, DPP devices have no mutual authentication function with a configurator. Thus, those DPP devices, as enrollees, may accept the first configuration response from the first configurator that attempts the configuration. After the enrollee receives the configuration response, the enrollee may engage in the subsequent DPP procedures and may be connected to a network according to the configuration response.

However, in some cases, the first configurator responding to the enrollee may be an untrusted entity and attempt to connect the enrollee to a fake DPP service network to steel information from the enrollee. Once the enrollee is on-board to the fake DPP service network and transmit data over the fake DPP service network, the transmitted data may be transmitted to other untrusted entities which may result in important data leakage. For example, when a user brings his smart phone into a serving range of a fake network, the smart phone broadcasts its presence, a fake configurator will attempt to connect the smart phone to the fake network. Once the smart phone is connected to the fake network, information transmitted over the fake network will be exposed to the fake network.

Various example implementations of the present disclosure propose detection scheme for an untrusted configurator. Specifically, an access point (AP) managed by a network device uses enrollee authentication information simulated by the network device to simulate and broadcast a configuration request comprising the enrollee authentication. Only the untrusted configurator will respond to the configuration request and attempts to configure the AP. Upon receiving the configuration response, the AP identifies the responding configurator as an untrusted configurator. Then, the AP transmits device information of the untrusted configurator to the network device. As noted, the network device can be used to manage the AP and may take remedial action.

With these implementations, after the AP identifies the untrusted configurator, the AP will not be configured based on the configuration information provided by the untrusted configurator and an untrusted configurator can be detected. In this way, the untrusted configurator can be accurately found, thereby avoiding devices being connected to untrusted network, which may leak credential information.

FIG. 1A illustrates a block diagram of an example network environment 101 in which example implementations of the present disclosure may be implemented. As illustrated in FIG. 1A, the network environment 101 includes an AP 110-1, an AP 110-2, an AP 110-3 (the AP 110-1, the AP 110-2 and the AP 110-3 may be collectively referred to as APs 110), a network device 120, a configurator 130 and a user equipment (UE) 140. The network device 120 may be a central access controller and configured to manage the AP 110-1, the AP 110-2 and the AP 110-3. The APs 110 and the network device 120 may function according to the IEEE 802.11 family of wireless communication protocol standards, for example defined by the IEEE 802.11-2016 specification or amendments thereof including, but not limited to, 802.11ah, 802.11ad, 802.11ay, 802.11ax, 802.11az, 802.11ba and 802.11be. These standards define the WLAN radio and baseband protocols for the physical (PHY) and MAC layers.

In the implementation as illustrated in FIG. 1A, the APs 110, the configurator 130 and the UE 140 may support DPP protocol. The DPP protocol is typically exchanged between a pair of devices, where one device takes on the role of a configurator and the other device takes on the role of an enrollee. The configurator 130 may be used to setup an infrastructure network including the APs 110. In particular, the configurator 130 may first provision the APs 110 to connect the APs 110 to a network and then provision the UE 140 to be connected the APs 110 using appropriate configuration information to support subsequent discovery and connectivity to the infrastructure network received from the configurator 130.

According to the DPP architecture, the configurator 130 and the APs 110 as well as the UE 140 may engage in DPP bootstrapping, the DPP authentication protocol and the DPP configuration protocol. After the authentication is completed, the configurator 130 may provision the APs 110 and UE 140 for device-to-device communication or infrastructure communication. As a part of provisioning, the configurator 130 may enable the APs 110 and UE 140 to establish secure associations with each other or other peers in the network.

In some example implementations, the provisioned UE 140 may periodically broadcast DPP presence announcement frames before the bootstrapping procedure so that DPP Authentication and Configuration procedures may be initiated by the configurator 130 upon receiving the presence announcement frame. In this case, when the UE 140 receives a response to the presence announcement frame from the configurator 130, the UE 140 may obtain device information of the configurator 130 which allows the UE 140 to identify the configurator 130. Therefore, the enrollee may identify the configurators in its serving range by exchange of request and response frames.

Figure 1B:
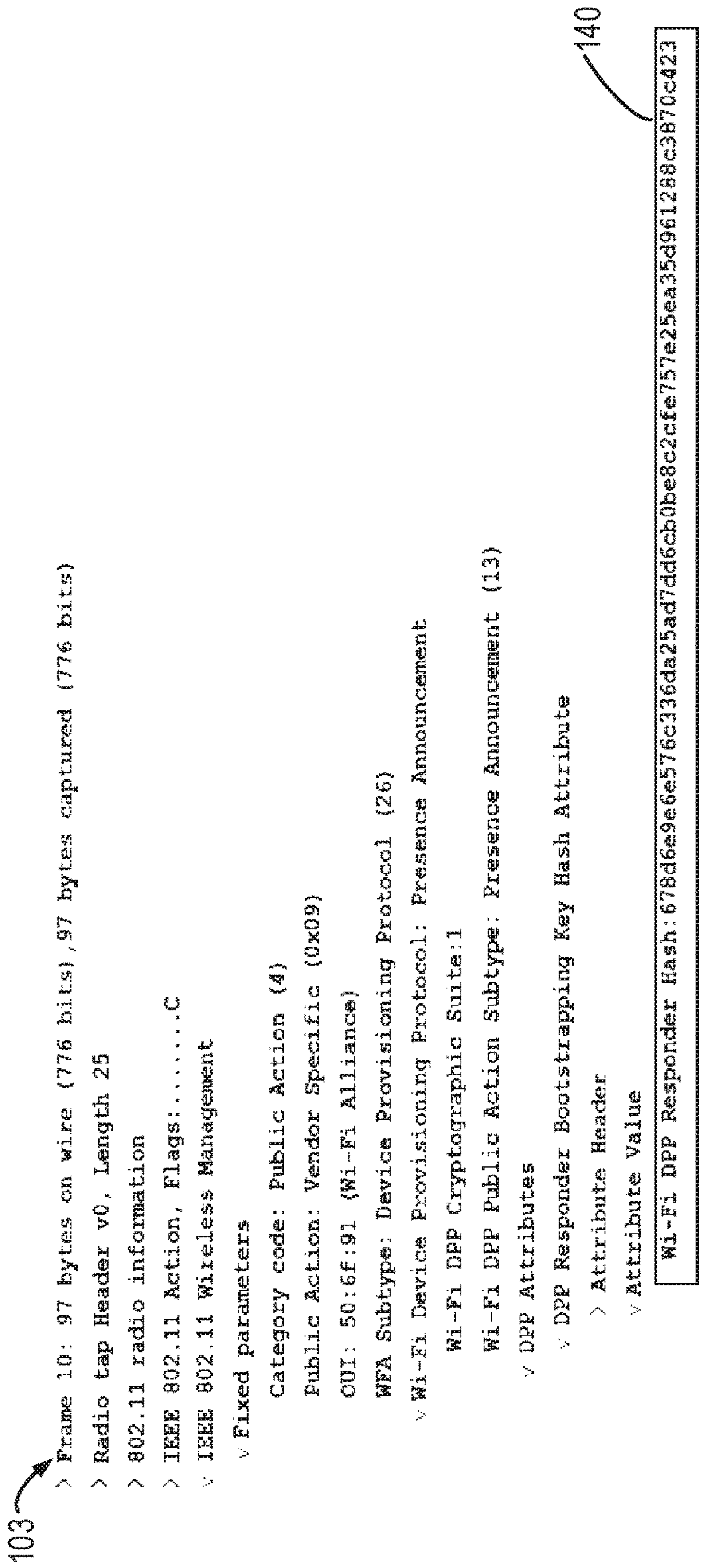
FIG. 1B illustrates an example configuration request in accordance with some example implementations of the present disclosure.

To detect configurators nearby, the APs may operate in two modes, including a simulating mode and a normal mode. In the simulating mode, the APs 110 may simulate an enrollee to broadcast configuration request according to the DPP protocol. Correspondingly, in the normal mode, the APs 110 may operate normally to provide some network services. In the implementation as illustrated in FIG. 1A, the AP 110-1 may operate in the simulating mode while the AP 110-2 may operate in the normal mode providing assistance. At first, the AP 110-1 may simulate an unprovisioned device and periodically announce its presence by sending configuration requests to signal a potential configurator that it is ready to engage in a DPP exchange. An example configuration request 103 in accordance with some example implementations of the present disclosure is illustrated in FIG. 1B. As illustrated in FIG. 1B, the configuration request 103 corresponds to a DPP presence announcement frame and includes a DPP hash field 140. The hash field contains the enrollee's (the AP 110-1) public bootstrapping key. In other words, the value of the hash field is associated with the device. Thus, the enrollee may be identified by other devices that receive the DPP presence announcement frame.

In some example implementations, the APs 110 may broadcast a DPP presence announcement frame with a simulated hash value to conceal its true identification for security purpose. For example, the AP 110-1 may use a randomly-simulated hash value which is different from the DPP hash key of AP 110-1. Thus, the AP 110-1 may simulate an enrollee as another device. In this way, the device that receives the DPP presence announcement frame could not identify the enrollee correctly.

Back to FIG. 1A, the configurator 130 is in the serving range of the AP 110-1 and may have a public bootstrapping key for the AP 110-1. The configurator may respond to the configuration request with a configuration response to initialize DPP authentication. A DPP authentication exchange to the AP 110-1 is thus initiated by the configurator 130 using the channel on which the DPP presence announcement frame was received. The configuration response may include provisioning data and device information of the configurator 130. Once the AP 110-1 receives the configuration response, the AP 110-1 will identify the configurator 130 based on the received device information.

On the other end, the AP 110-2 may also receive the DPP presence announcement frame. Since the AP 110-2 is managed by the same network device 120 as the AP 110-1, the AP 110-2 may know the true hash of the AP 110-1. By comparing the computed value from the bootstrapping key with the value in the received DPP presence announcement frame for example the hash value in the DPP hash field 140 as illustrated in FIG. 1B, the AP 110-2 may know whether the hash contained in the DPP presence announcement frame is true. In some alternative implementations, the AP 110-2 may maintain a list of MAC address of the trusted entities in the same network and identify the AP 110-1 by its MAC address. Further, the AP 110-2 may act according to the authenticity of the hash value. For example, when the AP 110-2 receives a DPP presence announcement frame with a fake hash value, the AP 110-2 will not respond to the frame. When the AP 110-2 receives a DPP presence announcement frame with a true hash value, the AP 110-2 will respond to initiate subsequent DPP procedures. The AP 110-3 may also operate in the normal mode. However, different from the AP 110-1 and the AP 110-2, the AP 110-3 has not received the DPP presence announcement frame.

In order to improve the security of the network, the APs 110 may also identify untrusted configurators using the simulated enrollee authentication information. As discussed above, the AP may operate in the simulating mode or the normal mode. In identifying untrusted configurators, the APs operating in different modes may act as different roles performing different actions.

Figure 2:
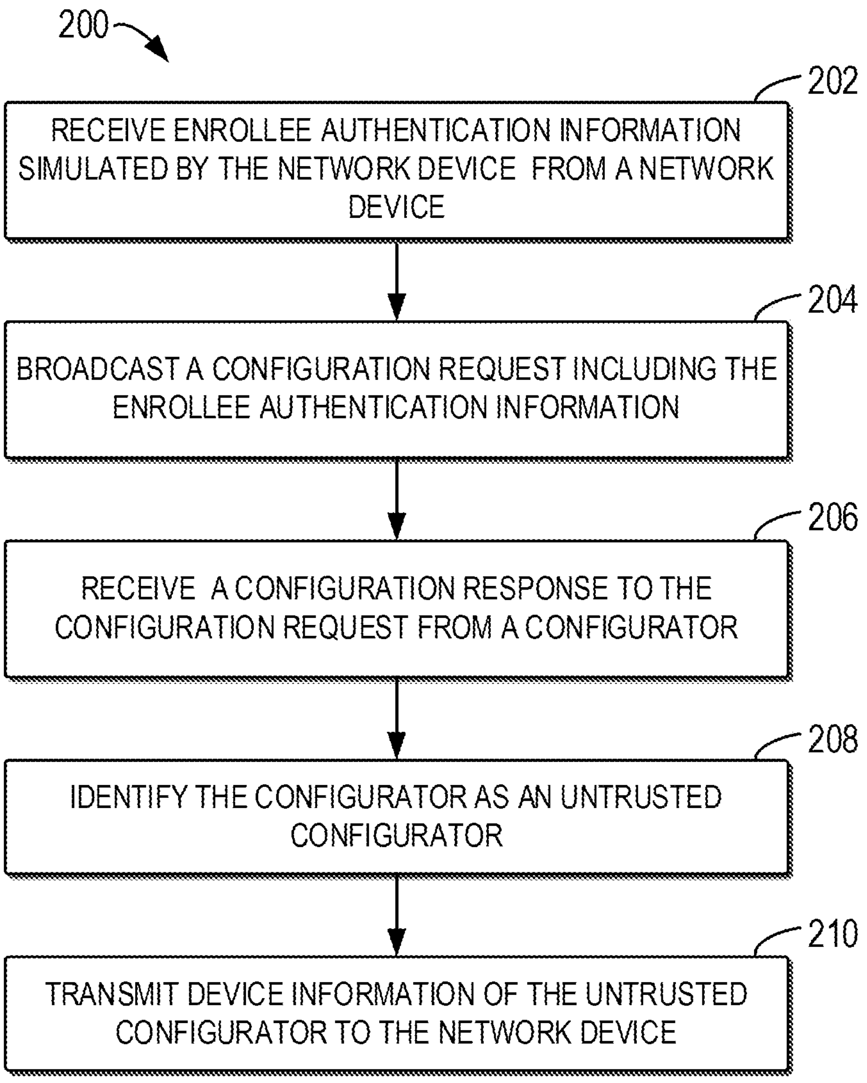
FIG. 2 illustrates a flowchart of an example method of untrusted configurator detection implemented by an AP simulating an enrollee in accordance with some example implementations of the present disclosure.

FIG. 2 illustrates a flowchart of an example method 200 of untrusted configurator detection implemented by an AP simulating an enrollee in accordance with some example implementations of the present disclosure. For, example, the method 200 may be implemented by the AP 110-1, 110-2 or 110-3 in FIG. 1. While only some blocks are illustrated in the method 200, the method 200 may comprise other blocks described herein.

At 202, an AP receives enrollee authentication information simulated by a network device from the network device. For example, the AP 110-1 in FIG. 1A may operate in the simulating mode and receive enrollee authentication information simulated by the network device 120 from the network device 120. In some example implementations, the enrollee authentication information may be a hash in associated with a device for example as illustrated in FIG. 1B. In this case, the simulated authentication information is different from the authentication information of the AP 110-1. Besides the AP 110-1, the simulated enrollee authentication information may also be distributed to all the trusted devices (for example the AP 110-2) managed by the network device 120 so that the other trusted devices may know the authenticity of the hash.

In some example implementations, the AP 110-1 may receive the enrollee authentication information periodically. The enrollee authentication information received at different times may be different. In this way, an untrusted configurator that was added at a different time could not know whether the enrollee authentication information is true based on the previously-received enrollee authentication information. so that the untrusted configurators cannot recognize the simulated enrollee authentication information thereby further improving the security level.

At 204, the AP broadcasts a configuration request including the enrollee authentication information. For example, when the AP 110-1 receives simulated enrollee authentication information, the AP 110-1 may broadcast a configuration request including the enrollee authentication information. In some example implementations, the configuration request may comprise a DPP presence announcement frame with a simulated key hash as the enrollee authentication information. In some example implementations, the configuration request is transmitted as a DPP chirp. Since the enrollee authentication information is simulated, the AP 110-1 will be viewed as a different device which would not reveal the real key and identification of the AP 110-1.

In some example implementations, the AP 110-1 may broadcast a configuration request once the AP 110-1 receives enrollee authentication information from the network device 120. Alternatively, the AP 110-1 may be configured to broadcast the configuration request at a pre-configured interval.

At 206, the AP receives a configuration response to the configuration request from a configurator. For example, the AP 110-1 may receive a configuration response to the configuration request from a configurator 130. The configuration response may include provisioning data essential for an enrollee to be provisioned to be connected to the network. The configuration response may further include the device information of the configurator, for example, the MAC address of the configurator. In some example implementations, the AP may receive a plurality of configuration response from a plurality of configurators. The AP may identify all the configurators from the device information contained in the At 208, the AP identifies the configurator as an untrusted configurator. For example, the AP 110-1 identifies the configurator 130 as an untrusted configurator upon receiving the configuration response from the configurator 130. In one example, the configuration request is simulated and not intended to result in a legitimate response. When the AP 110-1 receives the configuration response, the AP 110-1 can recognize that the responding configurator 130 is not aware that the authentication information comprised in the configuration request is simulated. Thus, the AP 110-1 may determine that the configurator 130 is attempting to configure the AP 110-1 to be connected to untrusted network. Therefore, when a configuration response is received, the AP 110-1 may determine that the sender of the configuration response is untrusted.

In another example, the trusted configurators may not receive the simulated authentication information from the network device or any other trusted devices in the network. Thus, the trusted configurators may also respond to the configuration request. In this example, the AP may compare the device information of the responding configurator with a list of the device information of the trusted devices. If the received device information is not in the list, the AP may determine that the responding configurator is untrusted. In some example implementations, the network device is implemented by a central access controller. An access controller refers to a wireless access control server. The access controller is used for converging data from different APs and transmitting the data to the Internet. The access controller performs the configuration management of the APs, wireless user authentication, management and access of the broadband, security and other control functions.

At 210, the AP transmits device information of the untrusted configurator to the network device. The AP 110-1 may transmit device information of the untrusted configurator 130 to the network device 120. In some implementations, the device information may include an identifier of the configurator and an MAC address of the configurator. For example, after the AP 110-1 receives the configuration response from the untrusted configurator, the AP 110-1 may extract the MAC address of the transmitter form the configuration response, and generate the device information based on the MAC address. Then, the AP 110-1 will transmit the device information in a further message to the network device so that the network device can determine the subsequent actions.

With these implementations, untrusted configurators would respond to the configuration request with simulated enrollee authentication information. Thus, when the AP simulating the enrollee receives the response, the AP could identify the untrusted configurator. In this way, an untrusted configurator attempting to on-board the AP 110-1 onto fake DPP network can be detected, thereby avoiding credential information leakage.

In some example implementations, the AP in the simulating mode may further detect a signal strength of a signal transmitted by the untrusted configurator. Then, the AP transmits signal information indicating the signal strength to the network device. In these example implementations, the signal strength may be used by the network device to locate the physical position of the untrusted configurator so that the maintenance personnel can find the untrusted configurator and eliminate the threat.

Figure 3:
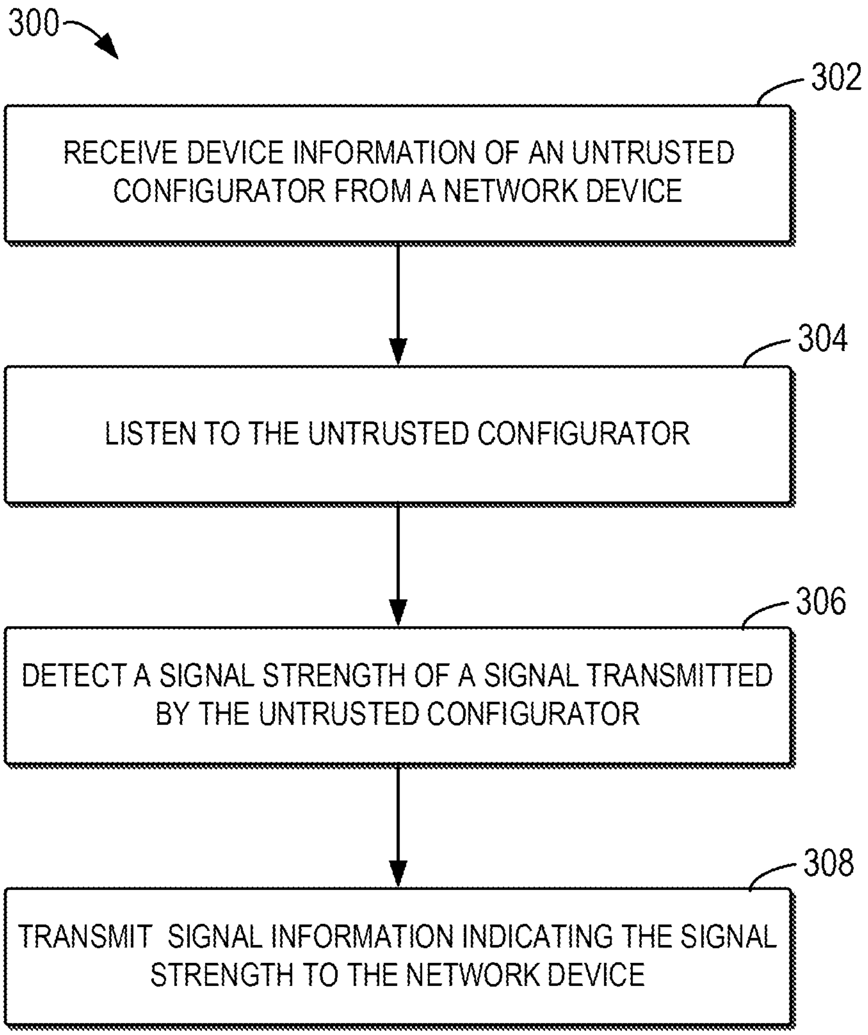
FIG. 3 illustrates a flowchart of an example method of untrusted configurator detection implemented by an AP operating normally in accordance with some example implementations of the present disclosure.

In one example, to help remediate against activities of the untrusted configurator, other APs can help add the untrusted configurator into a blacklist and discard the frames transmitted by the untrusted configurator. Alternatively or additionally, the AP may notify the network device to ban or quarantine the untrusted configurator. In addition to the AP operating in the simulating mode, there may be other APs operating in the normal mode to assist detecting untrusted configurators. FIG. 3 illustrates a flowchart of an example method 300 of untrusted configurator detection implemented by an AP operating normally in accordance with some example implementations of the present disclosure. For, example, the method 300 may be implemented by the AP 110-2 in FIG. 1. While only some blocks are illustrated in the method 300, the method 300 may comprise other steps described herein.

At 302, the AP receives device information of an untrusted configurator from the network device. For example, the AP 110-2 in FIG. 1A may operate in normal mode to assist detecting the untrusted configurators. The AP 110-2 may receive device information of an untrusted configurator from the network device 120. As described above, once an untrusted configurator is detected, the network device 120 may distribute the device information of the detected untrusted configurator to all the APs (for example the AP 110-2) managed by the network device 120.

At 304, the AP listens to the untrusted configurator. For example, the AP 110-2 may start to listen to the untrusted configurator when the AP 110-2 receives the device information of the untrusted configurator. Since the device information such as the MAC address of the untrusted configurator is received, the AP 110-2 may monitor the signal transmitted by the untrusted configurator based on the device information.

At 306, the AP detects a signal strength of a signal transmitted by the untrusted configurator. For example, the AP 110-2 may capture a signal transmitted from the MAC address of the untrusted configurator and measure a signal strength of the signal. In some example implementations, the AP 110-2 or any other devices may transmit a signal to the untrusted configurator to cause the untrusted configurator to transmit a signal. Once the untrusted configurator transmits the triggered signal, the AP 110-2 or other may capture the signal and measure a signal strength of the signal.

At 308, the AP transmits signal information indicating the signal strength to the network device. For example, the AP 110-2 may transmit signal information indicating the signal strength to the network device 120. In some example implementations, the signal information may be a received signal strength indicator (RSSI). The distance between the untrusted configurator and the AP may be determined by the RSSI. However, the RSSI does not indicate the orientation of the signal. In this regard, the network device may receive at least three RSSIs measured by at least three APs and determine the physical location of the untrusted by performing triangulation algorithms on the received RSSIs. In this way, the normally operating APs in the network may assist the AP simulating the enrollee to locate the untrusted configurator.

In some example implementations, the AP 110-2 may receive a configuration request from a further AP for example the AP 110-1 in FIG. 1A. Then, the AP 110-2 determines whether the configuration request comprises the enrollee authentication information simulated by the network. If the configuration request comprises the simulated enrollee authentication information, the AP 110-2 may discard the request and does not respond to the configuration request. In these implementations, the AP 110-2 realizes that the configuration request transmitted by another AP is simulated and must not make any response so that the AP 110-2 would not be identified as untrusted by mistake.

Correspondingly, if the AP 110-2 determines that the configuration request does not comprise the enrollee authentication information, the AP 110-2 responds to the configuration request with a configuration response. In these implementations, the AP 110-2 can still function as a trusted configurator to provision other devices.

It should be appreciated that when the AP 110-1 operates in the normal mode, it may also perform the method 300. Further, the AP 110-1 may also be configured to only operate in simulating mode while the AP 110-2 may be configured to only operate in normal mode, or vice versa.

Figure 4:
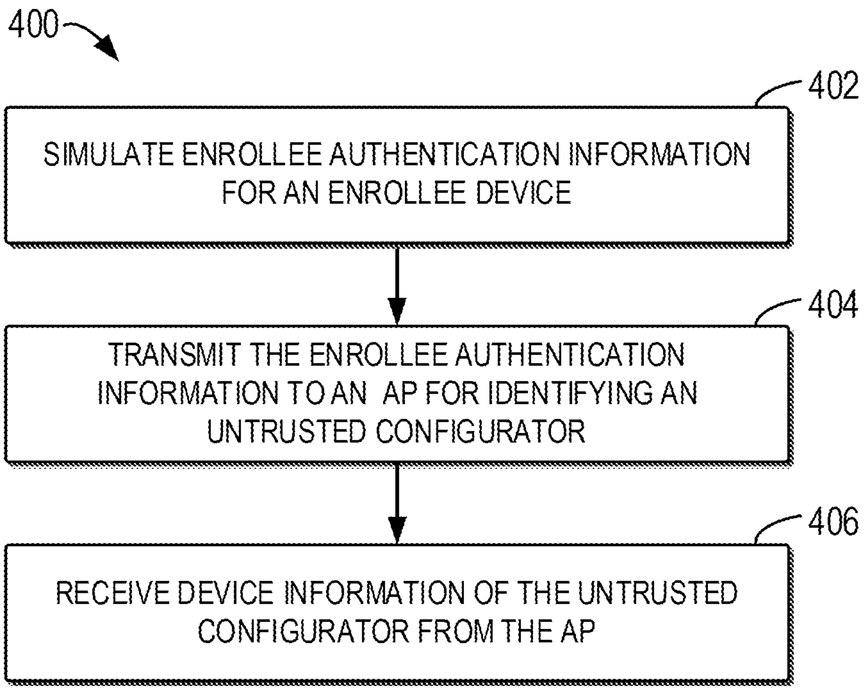
FIG. 4 illustrates a flowchart of an example method of untrusted configurator detection implemented by a network device in accordance with some example implementations of the present disclosure.

FIG. 4 illustrates a flowchart of an example method 400 of untrusted configurator detection implemented by a network device in accordance with some example implementations of the present disclosure. For, example, the method 400 may be implemented by the network device 120 in FIG. 1. While only some blocks are illustrated in the method 400, the method 400 may comprise other blocks described herein.

At 402, the network device simulates enrollee authentication information for identifying an untrusted configurator. For example, the network device 120 in FIG. 1A may simulate enrollee authentication information for a simulated enrollee device. In some example implementations, the network device 120 may simulate enrollee authentication information periodically. In this case, the enrollee authentication information simulated at different time is different. In some embodiments, the network device 120 may generate key hash with a format corresponding to a DPP bootstrapping key hash. The generated enrollee authentication information may be stored in an authentication information database.

In some example implementations, once enrollee authentication information is generated randomly, it may be compared with all the enrollee authentication information prestored in the authentication information database. If the newly-generated enrollee authentication information is different from all the enrollee authentication information prestored in the authentication information database, the newly-generated enrollee authentication information will be distributed to all the APs managed by the network device 120.

At 404, the network device transmits the enrollee authentication information to the AP 110-1. For example, the network device 120 may transmit the enrollee authentication information for identifying an untrusted configurator to the AP 110-1 and the AP 110-2. The AP 110-1 may use the enrollee authentication information to detect the untrusted configurators. In some example implementations, the simulated authentication information may be distributed to multiple of the APs managed by the network device 120 so that the APs can perform the methods 200 and 300 of untrusted configurator detection as illustrated in FIGS. 2-3.

At 406, the network device receives device information of the untrusted configurator from an AP. For example, the network device 120 receives device information of the untrusted configurator from the AP 110-1. If one of the APs managed by the network device detects an untrusted configurator, the device information may be reported to the network device. Then, the network device may further distribute the device information to all the devices managed by the network device. For example, when the network device 120 receives the device information from the AP 110-1, the network device 120 may relay the device information to the AP 110-2.

In some example implementations, the network device may receive respective signal information indicating signal strengths of a signal transmitted by the untrusted configurator from three APs respectively. Then, the network device determines a location of the untrusted configurator based on the received signal information. For example, a first distance between the AP 110-1 and the untrusted configurator may be derived from the signal information measured at the AP 110-1. A second distance between the AP 110-2 and the untrusted configurator may be derived from the signal information measured at the AP 110-2. A third distance between the AP 110-3 and the untrusted configurator may be derived from the signal information measured at the AP 110-3. Then, a first circle with a radius of the first distance is formed and centered at the location of the AP 110-1. A second circle with a radius of the second distance is formed and centered at the location of the AP 110-2. A third circle with a radius of a third distance is formed and centered at the location of the AP 110-3. The intersection point of the first, second and third circles is the estimated location of the untrusted configurator.

Figure 5A:
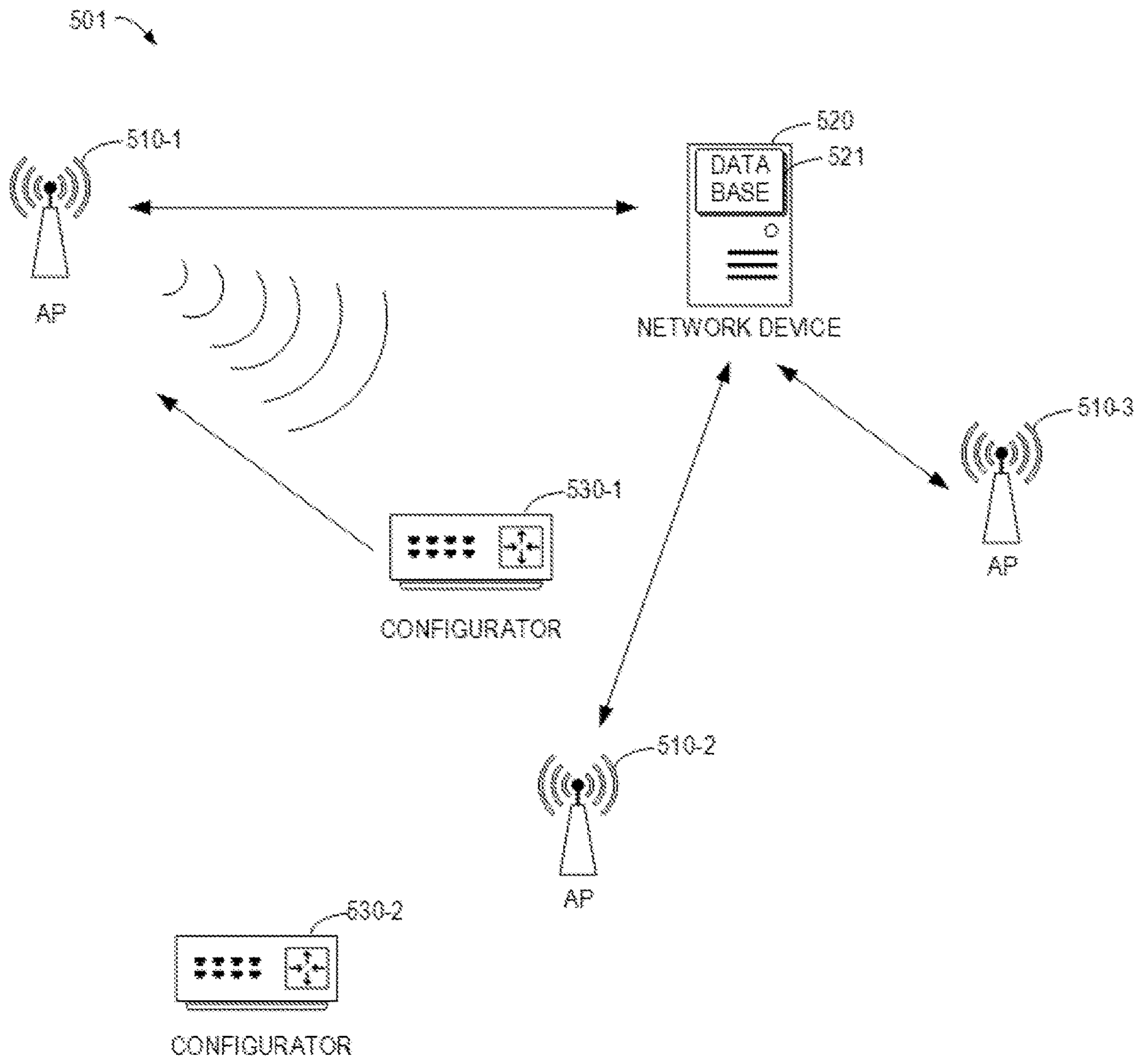
FIGS. 5A-5B illustrate example network environments for untrusted configurator detection in accordance with some example implementations of the present disclosure.

FIG. 5A illustrates an example network environment 501 for untrusted configurator detection in accordance with some example implementations of the present disclosure. As illustrated in FIG. 5A, the network environment 501 comprises an AP 510-1 simulating an enrollee, an AP 510-2 and an AP 510-3 (may be referred to as APs 510 collectively with the AP 510-1 and the AP 510-2). Further, the network environment 501 includes a network device 520 managing the APs 510. For example, the APs 510 may support DPP protocol. In the serving range of the APs 510, a configurator 530-1 and a configurator 530-2 (referred to as untrusted configurators 530 collectively with the configurator 530-1) are located separately.

To detect the untrusted configurators 530, the network device 520 simulates enrollee authentication information which is different from those managed and authenticated by the network device 520. The network device 520 includes a database 521. It should be appreciated that the database 521 may be integrated in the network device 520 as illustrated and also be remotely connected to the network device 520. When the simulated enrollee authentication information is generated, it will be stored in the database 521. Further, the database 521 may store authentication information from all of the APs 510 managed by the network device 520. The network device 520 transmits the simulated authentication information to all of the APs 510. Once the APs 510 receive the simulated authentication information, the APs 510 simulate enrollees in turn to broadcast configuration request comprising the simulated authentication information according to a pre-configured broadcasting schedule. It should be appreciated that the broadcasting schedule may be pre-configured during provisioning of the APs 510. The broadcasting schedule may also be distributed by the network device 520 based on the overall coordination.

In the illustrated implementation, the AP 510-1, the AP 510-2 and the AP 510-3 are scheduled coordinately to simulate an enrollee. As illustrated in FIG. 5A, the AP 510-1 is simulating the enrollee to broadcast the configuration request. The AP 510-2 and AP 510-3 are scheduled to simulate the enrollee subsequently. The configuration request is received by the configurator 530-1. The configurator 530-1 responds to the configuration request with a configuration response. When the AP 510-1 receives the configuration response, the AP 510-1 identifies the configurator as an untrusted configurator. The AP 510-2 and the AP 510-3 may be in the serving range of the AP 510-1 and receive the configuration request. In this case, the AP 510-2 and the AP 510-3 extract the authentication information from the configuration request and compare the extracted authentication information with all the enrollee authentication information simulated by the network device 520. If the extracted authentication information corresponds to one of the simulated enrollee authentication information, the AP 510-2 and the AP 510-3 do not respond to the configuration request. If the extracted authentication information is different from the simulated enrollee authentication information, the AP 510-2 and the AP 510-3 may function as a configurator and respond to the enrollee with a configuration response. In this implementation, the configurator 530-2 is outside the serving range of the AP 510-1 and does not receive the configuration request. Thus, whether the configurator 530-2 is trusted cannot be determined.

After the AP 510-1 identifies the untrusted configurator 530-1, for example, the AP 510-1 acknowledges the MAC address of the untrusted configurator 530-1, the AP 510-1 transmits the device information of the untrusted configurator 530-1 to the network device 520. The device information will be distributed by the network device 520 to the AP 510-2 and the AP 510-3. Upon receiving the device information, the AP 510-2 and the AP 510-3 may also listen to the untrusted configurator 530-1 besides the AP 510-1. Once the untrusted configurator 530-1 transmits a signal, the AP 510-1, 510-2 and 510-3 detect a signal strength of the transmitted signal respectively. Then, the AP 510-1, 510-2 and 510-3 may transmit the signal information indicating the signal strength to the network device 520 respectively to locate the physical location of the untrusted configurator 530-1.

Figure 5B:
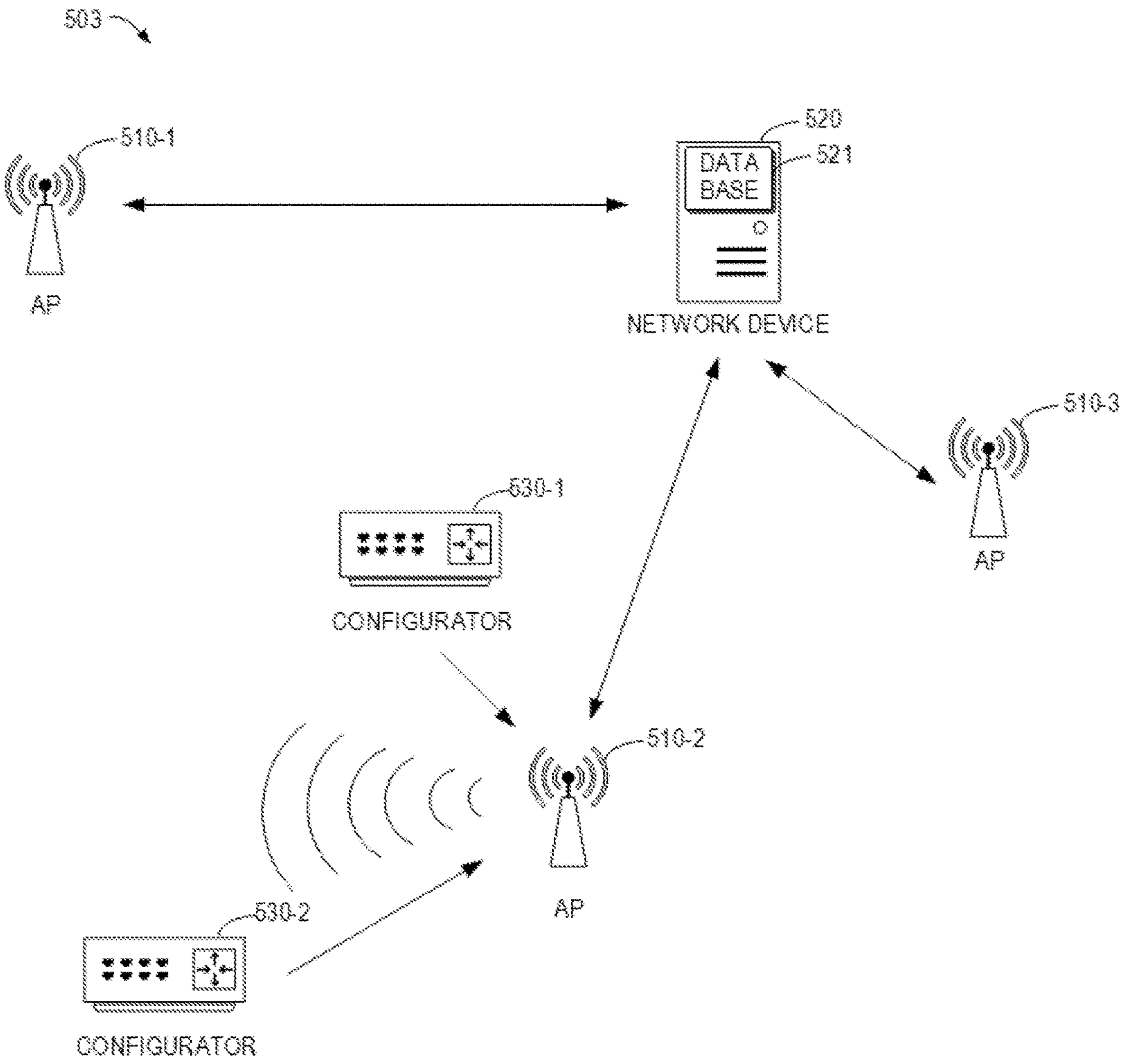

FIG. 5B illustrates a further example network environment 503 for untrusted configurator detection in accordance with some example implementations of the present disclosure. In the network environment 503, the broadcasting time period for the AP 510-1 has passed. The AP 510-2 is scheduled after AP 510-1 and is simulating the enrollee to broadcast the configuration request. The configuration request transmitted by the AP 510-2 contains further enrollee authentication information different from the previous enrollee authentication information transmitted by the AP 510-1. In this case, both the configurator 530-1 and the configurator 530-2 are located in the serving range of the AP 510-2. Since the further authentication information is different from the last authentication information contained in the last configuration request, the configurator 530-1 cannot recognize that the authentication information is simulated based on the previous record. Therefore, both of the configurator 530-1 and configurator 530-2 respond to the configuration request.

After the configuration responses are received, the AP 510-2 identifies the configurator 530-1 and the configurator 530-2 as untrusted. Since the device information of the untrusted configurator 530-1 has already been recorded and distributed by the network device 520, the AP 510-2 only transmits the device information of the untrusted configurator 530-2 to the network device 520 which will be further distributed by the network device 520 to the AP 510-1 and the AP 510-3. Upon receiving the device information, the AP 510-1 and the AP 510-3 listen to the untrusted configurator 530-2 and detect the signal strength of the transmitted signal respectively. Then, the AP 510-1, 510-2 and 510-3 may transmit the signal information indicating the signal strength to the network device 520 respectively. Then, the network device 520 determines the physical location of the untrusted configurator 530-2 based on the signal information, for example according to a received signal strength indication (RSSI) algorithm.

Figure 6:
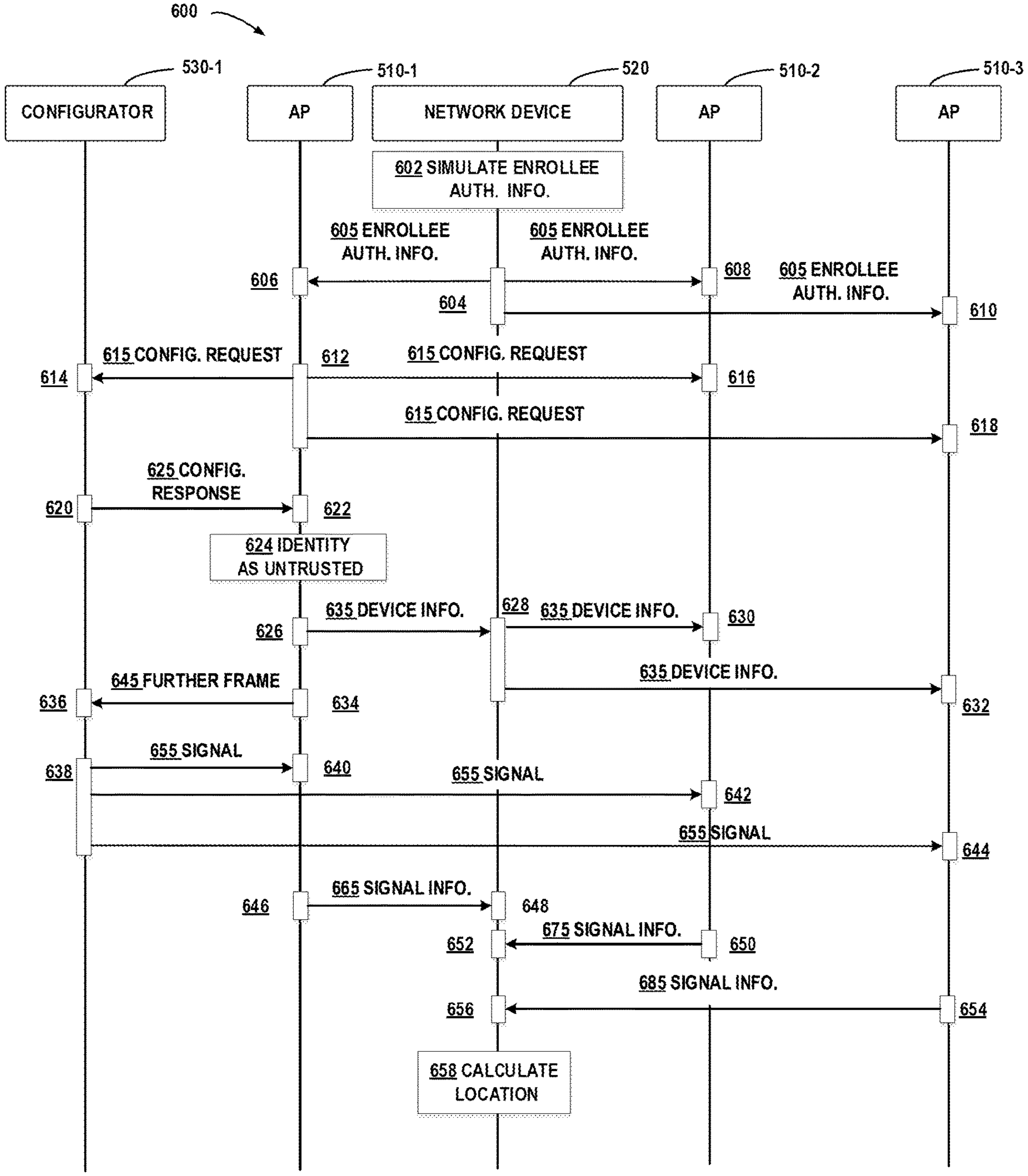
FIG. 6 illustrates an example signaling diagram for an example process of untrusted configurator detection in accordance with some example implementations of the present disclosure.

FIG. 6 illustrates a signaling diagram for an example process 600 of untrusted configurator detection in accordance with some example implementations of the present disclosure. For the purpose of discussion, the process 600 will be described with reference to FIG. 5A.

As illustrated in FIG. 6, at 602, the network device 520 such as a central access controller simulates enrollee authentication information. The enrollee authentication information may be an enrollee's public bootstrapping key or a hash that derived from the public bootstrapping key. The network device 520 may periodically generate the key hash according to the predetermined format. Then, at 604, the network device 520 transmits the simulated enrollee authentication information 605 to all the APs which is managed by the network device 520. At 606, the AP 510-1 receives the enrollee authentication information 605, at 608, the AP 510-2 receives the enrollee authentication information 605, and at 610, the AP 510-3 receives the enrollee authentication information 605. At 612, after the AP 510-1 receives the enrollee authentication information 605, the AP 510-1 broadcasts a configuration request 615 including the enrollee authentication information 605. At 614, the configurator 530-1 receives the configuration request 615 and responds to the configurator 530-1 with a configuration response 625 at 620. Although at 616 and 618, the AP 510-2 and the AP 510-3 also receive the configuration request 615 respectively, the AP 510-2 and the AP 510-3 knows that the configuration request 615 is simulated and do not respond to the AP 510-1.

At 622, the AP 510-1 receives the configuration response 625 and the AP 510-1 identifies the configurator 530-1 as untrusted at 624. Then, at 626, the AP 510-1 extracts the device information 635 of the configurator 530-1 from the configuration response 625 and transmits the device information 635 to the network device 520. At 628, the network device 520 relays the device information 635 to the AP 510-2 and the AP 510-3. At 630, the AP 510-2 receives the device information 635, and at 632, the AP 510-3 receives the device information 635. After the AP 510-2 and the AP 510-3 receive the device information 635, they start to listen to the configurator 530-1. In order to cause the configurator 530-1 to transmit to a signal so that the APs may detect the strength of the signal, at 634, the AP 510-1 transmits a further frame 645 to the configurator 530-1. The further frame 645 may be any frame that can cause the configurator to respond to a frame. Upon receiving the further frame 645 at 636, the configurator 530-1 broadcasts a signal 655 at 638.

At 640, the AP 510-1 receives the signal 655 and detects a first signal strength associated with a distance between the AP 510-1 and the configurator 530-1. Similarly, at 642, the AP 510-2 receives the signal 655 and detects a second signal strength. At 644, the AP 510-3 receives the signal 655 and detects a third signal strength. After the signal strength are determined, at 646, the AP 510-1 transmits signal information 665 indicating the first signal strength to the network device 520. At 650, the AP 510-2 transmits signal information 675 indicating the second signal strength to the network device 520. At 654, the AP 510-1 transmits signal information 685 indicating the third signal strength to the network device 520. At 648, 652 and 656, the network device 520 receives the signal information 665, 675 and 685 respectively. In some embodiments, the signal information may be a received signal strength indicator (RSSI). At 658, the network device 520 calculates the physical location of the configurator 530-1 based on signal information 665, 675 and 685 according to triangulation position algorithms.

Triangulation based positioning method is a method for determining a location of an object. For example, the method forms circles centered at the AP 510-1, the AP 510-2 and the AP 510-3, where the radius of each circle is determined by the measured signal strength of the configurator 530-1. By using a proper propagation model, the respective distances from the configurator 530-1 to the APs 510 can be calculated and used as the radius of the respective circle. An intersection point of the circles is the estimated location of the untrusted configurator 530-1. Since the location of the untrusted configurator 530-1 has been located, the maintenance personnel can find the configurator 530-1 and eliminate the security threat.

Figure 7:
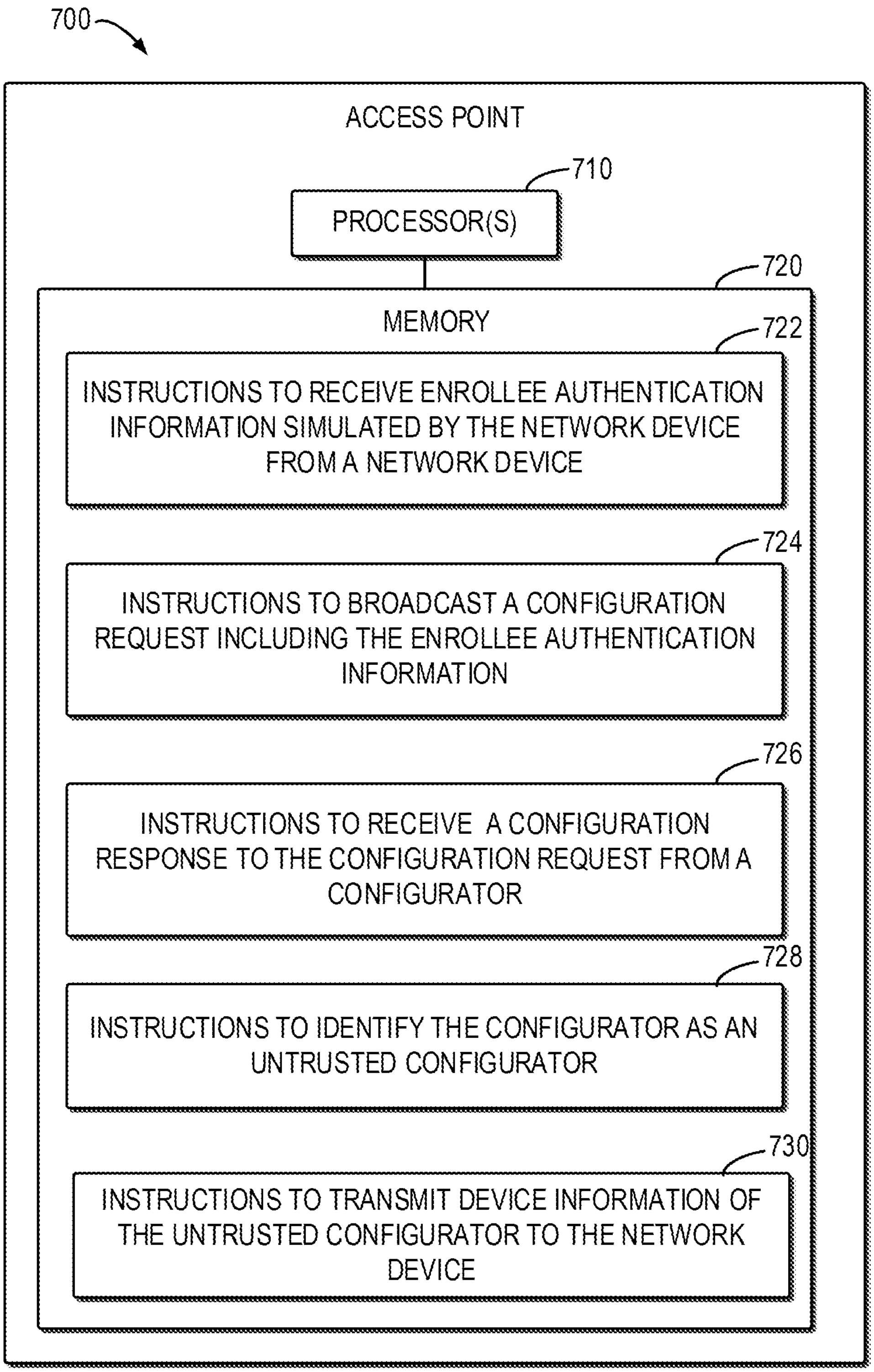
FIG. 7 illustrates a block diagram of an example AP in accordance with some example implementations of the present disclosure.

FIG. 7 illustrates a block diagram of an example AP 700 in accordance with some example implementations of the present disclosure. The AP 700 comprises at least one processor 710 and a memory 720 coupled to at least one processor 710. The memory 720 stores instructions to cause at least one processor 710 to implement actions.

As illustrated in FIG. 7, the memory 720 stores instructions 722 to receive enrollee authentication information simulated by the network device from a network device. The memory 720 further stores instructions 724 to broadcast a configuration request including the enrollee authentication information. The memory 720 further stores instructions 726 to receive a configuration response to the configuration request from a configurator. The memory 720 further stores instructions 728 to identify the configurator as an untrusted configurator in response to receiving the configuration response from the configurator. The memory 720 further stores instructions 730 to transmit device information of the untrusted configurator to the network device.

In these implementations, when executed by the AP 700, the instructions cause the AP 700 to simulate an enrollee to broadcast a configuration request containing simulated enrollee authentication information to trigger potential untrusted configurator to initiate DPP authentication and configuration procedures. When a configurator 530-1 of FIG. 5A responds to the AP 700, it will be identified as untrusted. The device information of the untrusted configurator 530-1, for example a MAC address, is reported to the network device 520 for subsequent actions.

Figure 8:
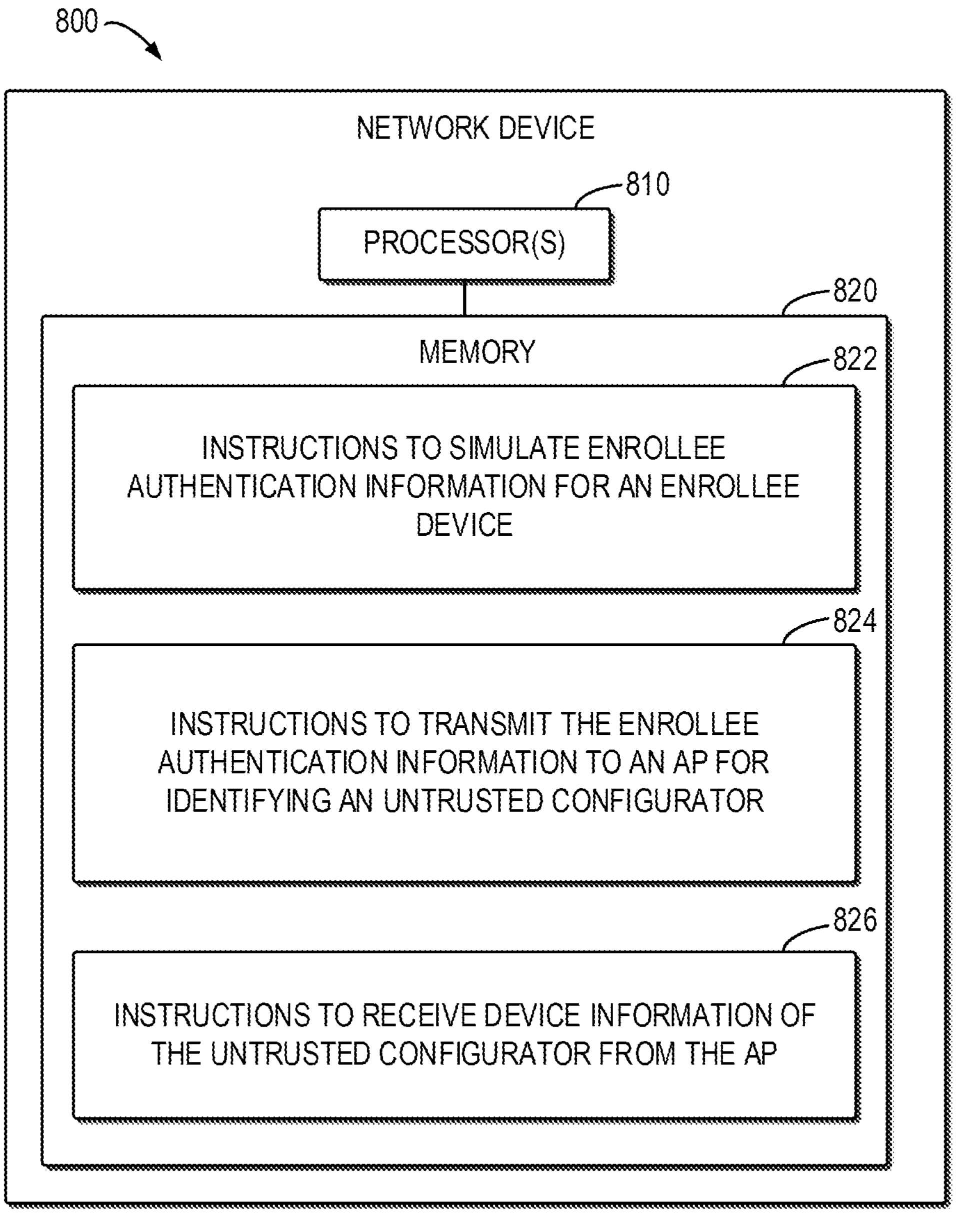
FIG. 8 illustrates a block diagram of an example network device in accordance with some example implementations of the present disclosure.

FIG. 8 illustrates a block diagram of an example network device 800 in accordance with some example implementations of the present disclosure. The network device 800 comprises at least one processor 810 and a memory 820 coupled to at least one processor 810. The memory 820 stores instructions to cause at least one processor 810 to implement actions.

As illustrated in FIG. 8, the memory 820 stores instructions 822 to simulate enrollee authentication information for an enrollee device. The memory 820 further stores instructions 824 to transmit the enrollee authentication information to a first AP for identifying an untrusted configurator. The memory 820 further stores instructions 826 to receive device information of the untrusted configurator from the first AP. When the first AP detects an untrusted configurator, the device information of the untrusted configurator may be reported.

The present disclosure also provides at least one computer program product tangibly stored on a non-transitory computer-readable storage medium. The computer program product includes program codes or instructions which can be executed to carry out the method as described above with reference to FIGS. 2-4.

While the above discussion used a Wi-Fi communication standard as an illustrative example, in other implementations a wide variety of communication standards and, more generally, wireless communication technologies may be used. Furthermore, while some of the operations in the foregoing implementations were implemented in hardware or software, in general, the operations in the preceding implementations can be implemented in a wide variety of configurations and architectures. Therefore, some or all of the operations in the foregoing implementations may be performed in hardware, software, or both.

It should be noted that specific terms disclosed in the present disclosure are proposed for convenience of description and a better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a computer-readable medium may be any tangible medium that may contain or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order illustrated or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is illustrated by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:

receiving, by an access point (AP) and from a network device, enrollee authentication information simulated by the network device;

broadcasting, by the AP, a configuration request including the enrollee authentication information;

receiving, by the AP and from a configurator, a configuration response to the configuration request;

in response to receiving the configuration response from the configurator, identifying, by the AP, the configurator as an untrusted configurator; and transmitting, by the AP and to the network device, device information of the untrusted configurator.

2. The method of claim 1, further comprising:

detecting a signal strength of a signal transmitted by the untrusted configurator; and transmitting, by the AP and to the network device, signal information indicating the signal strength.

3. The method of claim 1, wherein broadcasting the configuration request comprises:

determining, by the AP, a broadcasting time period based on a pre-configured broadcasting schedule; and in response to determining that the AP is operating in the broadcasting time period, broadcasting, by the AP, the configuration request.

4. The method of claim 3, wherein broadcasting the configuration request further comprises:

in response to determining the broadcasting time period has passed, terminating the broadcasting of the configuration request.

5. The method of claim 4, further comprising:

receiving, by the AP and from a further AP, a further configuration request out of the broadcasting time period;

determining, by the AP, whether the further configuration request comprises the enrollee authentication information simulated by the network; and in response to determining that the further configuration request comprises the enrollee authentication information, discarding the further configuration request.

6. The method of claim 5, further comprising:

in response to determining that the further configuration request does not comprise the enrollee authentication information, generating, by the AP, a further configuration response to the further configuration request.

7. The method of claim 4, further comprising:

receiving, by the AP and from the network device, device information of a second untrusted configurator out of the broadcasting time period;

listening, by the AP, to the second untrusted configurator;

detecting, by the AP, a second signal strength of a second signal transmitted by the second untrusted configurator; and transmitting, by the AP and to the network device, second signal information indicating the second signal strength.

8. The method of claim 1, wherein receiving the enrollee authentication information comprises:

receiving, by the AP and from the network device, enrollee authentication information simulated by the network device periodically, and wherein the broadcasting the configuration request including the enrollee authentication information comprises:

broadcasting the configuration request including different enrollee authentication information upon receiving the different enrollee authentication information.

9. The method of claim 2, wherein the signal information comprises a received signal strength indication (RSSI).

10. The method of claim 1, wherein the configuration request is comprised in a device provisioning protocol (DPP) chirp, and the enrollee authentication information comprises a DPP public key hash.

11. The method of claim 1, wherein the device information comprises a media access control (MAC) address.

12. A method comprising:

simulating, by a network device, enrollee authentication information for identifying an untrusted configurator;

transmitting, by the network device to a first access point (AP), the enrollee authentication information; and receiving, by the network device from the first AP, device information of the untrusted configurator.

13. The method of claim 12, further comprising:

transmitting, by the network device to a second AP and a third AP, the enrollee authentication information.

14. The method of claim 13, further comprising:

transmitting, by the network device to the second AP and the third AP, the device information of the untrusted configurator for listening to the untrusted configurator.

15. The method of claim 14, further comprising:

receiving, by the network device and from the first, second and third APs, first signal information indicating a first signal strength of a signal transmitted by the untrusted configurator, a second signal information indicating a second signal strength of a signal transmitted by the untrusted configurator, and a third signal information indicating a third signal strength of a signal transmitted by the untrusted configurator; and determining, by the network device, a location of the untrusted configurator based on the first, second and third signal information.

16. The method of claim 15, wherein determining the location of the untrusted configurator comprises:

calculating the location based on the first, second and third signal information according to a triangulation algorithm.

17. The method of claim 12, wherein simulating the enrollee authentication information comprises:

generating enrollee authentication information periodically.

18. The method of claim 17, wherein generating enrollee authentication information periodically comprises:

generating first enrollee authentication information randomly;

obtaining respective authentication information of a plurality of APs managed by the network work; and in response to determining that the first enrollee authentication information is different from the respective enrollee authentication information, determining the first enrollee authentication information for simulating an enrollee.

19. The method of claim 18, further comprising:

maintaining, by the network device, respective authentication information of the plurality of APs managed by the network device in a database.

20. An access point (AP) comprising:

at least one processor; and a memory coupled to the at least one processor, the memory storing instructions to cause the at least one processor to:

receive, from a network device, enrollee authentication information simulated by the network device;

broadcast a configuration request including the enrollee authentication information;

receive, from a configurator, a configuration response to the configuration request;

in response to receiving the configuration response from the configurator, identify the configurator as an untrusted configurator; and transmit, to the network device, device information of the untrusted configurator.

* * * * *